United States Patent [19]

May

[11] Patent Number: 5,579,284
[45] Date of Patent: Nov. 26, 1996

[54] SCUBA DIVING VOICE AND COMMUNICATION SYSTEM USING BONE CONDUCTED SOUND

[76] Inventor: David F. May, P.O. Box 2603, 1636 State St. Unit E, Columbus, India. 47202

[21] Appl. No.: 541,826

[22] Filed: Oct. 10, 1995

[51] Int. Cl.⁶ ................................................ H04B 11/00
[52] U.S. Cl. ........................................ 367/132; 340/850
[58] Field of Search ................................ 367/132, 131; 340/850

[56] References Cited

U.S. PATENT DOCUMENTS

| | | | |
|---|---|---|---|
| 3,789,353 | 1/1974 | Hunter et al. | 340/5 T |
| 3,819,860 | 6/1974 | Miller | 179/1 P |
| 4,071,110 | 1/1978 | Payne | 367/132 |
| 4,232,194 | 11/1980 | Adams | 179/1.5 R |
| 4,791,673 | 12/1988 | Schreiber | 381/151 |
| 5,031,611 | 7/1991 | Moles | 128/201.11 |
| 5,033,999 | 7/1991 | Mersky | 600/25 |
| 5,136,555 | 8/1992 | Gardos | 367/132 |
| 5,185,605 | 2/1993 | Roberts, Jr. et al. | 340/850 |
| 5,455,842 | 10/1995 | Mersky et al. | 367/132 |

*Primary Examiner*—Ian J. Lobo
*Attorney, Agent, or Firm*—Taylor & Associates, P.C.

[57] ABSTRACT

An underwater scuba diver communication system is disclosed which is comprised of an oral bone conduction mouthpiece based sound transmission and conduction device, an oral—mouthpiece based microphone, an ultrasonic sound transmission device, an ultrasonic receiving device and the electronic circuitry required to facilitate the transmission or reception of ultrasound transmitted signals through a water medium. The system is constructed to provide underwater diver voice communication with a modified scuba mouthpiece not unlike in appearance or function from a conventional second stage mouthpiece for a scuba diver breathing apparatus. This mouthpiece can also be configured to provide binaural input and/or output with two different transducers for locating sound direction underwater.

28 Claims, 4 Drawing Sheets

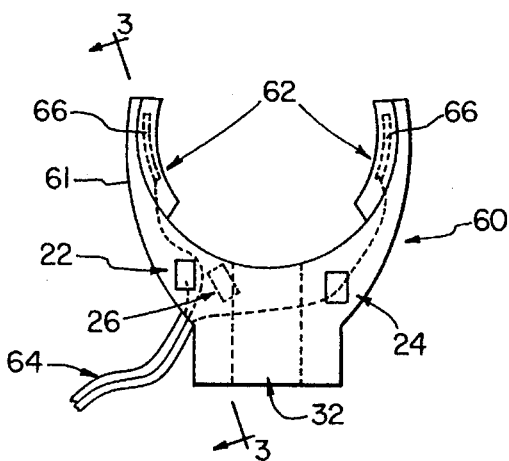
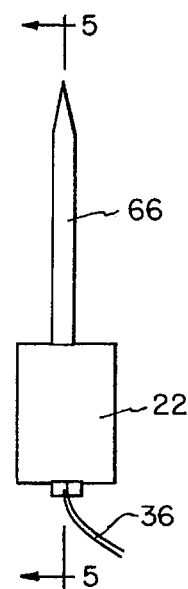
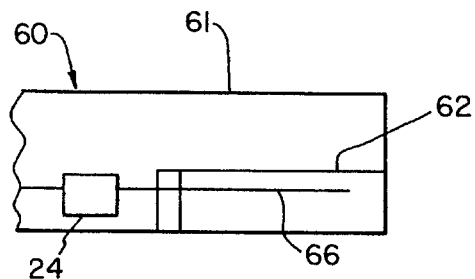
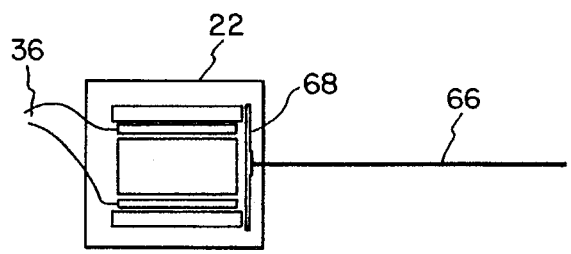
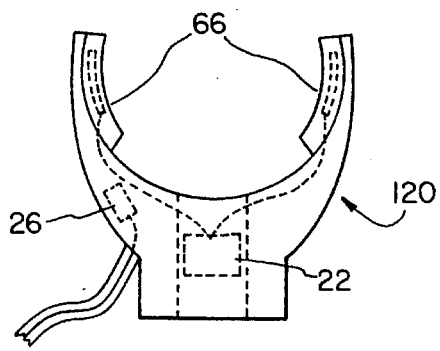
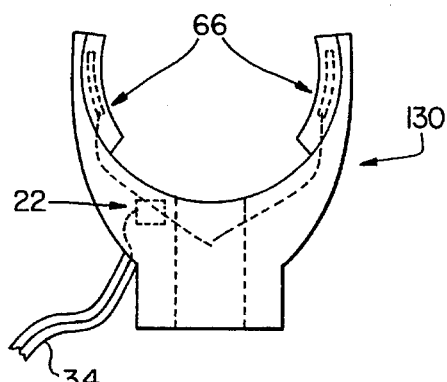
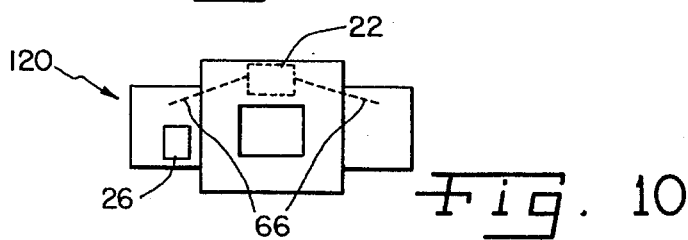

SCUBA DIVING VOICE AND COMMUNICATION SYSTEM USING BONE
CONDUCTED SOUND

CROSS REFERENCE TO RELATED APPLICATIONS

This is a non-provisional U.S. patent application based upon provisional U.S. patent application Ser. No. 60/011,345, filed Jul. 21, 1995, entitled "SCUBA DIVING VOICE AND COMMUNICATION SYSTEM USING BONE CONDUCTED SOUND".

BACKGROUND OF THE INVENTION

1. Field of the Invention

The present invention relates to audio communication systems, and, more specifically, to underwater audio communication systems.

2. Description of the Related Art

Most modern personal audio communication systems do not use bone conduction for sound transmission to the ear. Instead, sound is transmitted by air conduction to the ear canal where it is subsequently conducted through the middle ear to the cochlea where these vibrations are interpreted in the brain as sound. Examples of these systems are many from hand held 2 way radios, to FM and AM radios, to short and long wave radio communication systems. All of these rely on air conducted sound for the listener and speaker.

Several disadvantages of this type of system are found for underwater swimming. First, in order to facilitate an air gap between the ear and the sound source, it is necessary to provide a mask with an apparatus over the ears or a helmet covering the entire head. Some systems provide sound directly to the ear by placing a sound source against the outside of the outer ear. This has been the conventional approach for several years. While this approach is effective and provides for communication, this system is very expensive, cumbersome to use, is uncomfortable, requires special training for use, and provides poor sound quality. Further, such a system introduces a process and equipment which is very different from conventional scuba diving equipment, whereby in the case of an underwater loss of air, a buddy assistance measure requiring sharing of air is ineffective.

The helmet or full face hood currently used for communication is also more dangerous to the user in the event that water enters the air gap space in the hood because it is more difficult to clear the water from the intended air space due to the increased air volume and sealing surface than a normal mask which only covers the eyes and nose. A user's ability to obtain air for breathing also is impaired if problems occur with the full face hood, making it more dangerous than normal scuba diving gear.

Commercial units which rely on air conduction or direct ear contact sound transmission are currently available. Brand names and constructions are differentiated primarily on the type of sonar carrier, frequency of transmission, power, type of transmission send switch, transducer types and headgear configurations. This type of diving apparatus is shown in U.S. Pat. No. 3,789,353 to Hunter.

Examples of conventional audio listening systems without headphones are shown in U.S. Pat. No. 4,589,134 to Waldron for a sound system enclosed in a vest meant to be worn by the listener; U.S. Pat. No. 4,070,553 to Hass, for a scarf-tube enclosing a sound source meant to be worn around the listener's neck; U.S. Pat. No. 3,869,584 to Wilde, covering a device enclosing the ears of the individual listener; and U.S. Pat. No. 3,868,572 to Kaufman, representative of personal audio devices worn inside the ear of the individual listener.

Conventional bone conduction audio devices are typically hearing aids for the hearing impaired. Examples of such bone conduction hearing aids are disclosed in U.S. Pat. No. 2,230,500 to Lybarger; U.S. Pat. No. 2,258,638 to Zarth; and West German Patent No. 2451977 to Breckwoldt. Most modern bone conduction hearing aids include the ability to implant the bone conduction oscillator beneath the listener's skin in direct contact with the mastoid bone.

Particular to tooth oscillated bone conduction is U.S. Pat. No. 5,033,999 to Mersky, which is representative of a method and apparatus for endodontically augmenting hearing by the direct encapsulation of an audio transducer inside a tooth.

What is needed in the art is an underwater communication system which provides effective one-way or two-way communication with a diver, and which does not include the inherent problems associated with conventional systems using air conduction to transmit the sound waves through the ear canal.

SUMMARY OF THE INVENTION

The present invention provides a communication system using bone conduction for sound transmission to the ear by means of audible frequency transducers molded into a mouthpiece. The mouthpiece allows the user to hear voice or other communication sounds with clarity. Additionally, the mouthpiece converts spoken sounds to electrical signals such that those sounds can be subsequently transmitted. Aside from providing sound for hearing and voice reception, the mouthpiece functions the same as a currently commercially available scuba diving mouthpiece which is attached to a second stage scuba diving regulator and used for breathing.

The invention comprises, in one form thereof, a scuba diving mouthpiece which is attachable to a source of air and supplies air to a diver. A mouth engageable body includes at least one biteplate which is adapted for being disposed between and engageable by the teeth of the diver. At least one sound transducer is associated with the body, and capable of transmitting audio sounds through the biteplate, whereby the audio sounds may be conducted to the teeth of the diver.

The present invention provides an underwater communications system based on oral bone conducted sound through a scuba diving mouthpiece. It both receives spoken sounds for subsequent transmission and receives sounds from an amplifier source to be transmitted to the user's cochlea through bone conducted sound. No additional head gear or ancillary tubes, tethers, or attachments are required, thus creating a scuba diving device very similar to that with which all scuba divers are trained. The present invention is easily and economically manufactured, easy to operate, and easily maintained.

The present invention reduces problems which are inherent in commercially available underwater communications systems. By receiving sounds with bone conduction through a mouthpiece, a user is not required to wear any additional head straps. With current underwater communication systems, the full face mask, earphone, straps on the device which covers the mouth, or other pieces of equipment added to the scuba diver may become entangled. Problems can lead to a mask flooding condition, mask removal condition, or loss of air supply from a second stage regulator torn from the mouth. If the full face mask becomes flooded, it is very difficult or impossible for the scuba diver to clear the water from the hood while underwater due to the large volume of space inside the hood. In a situation where a scuba diver runs out of air and needs to buddy breath, buddy breathing is either nearly or totally impossible with currently commercially available systems. Because the present invention does not use a full face mask or hood, these problems inherent in conventional underwater communication systems are overcome.

An advantage of the present invention is that an underwater communications system is provided which operates by means of sound transducers molded into a mouthpiece, similar in construction to that which is normally utilized by scuba divers for underwater breathing.

Another advantage is that the underwater communication system of the present invention provides a system with better sound quality to the user by means of bone conducted sound from a mouthpiece to the cochlea.

Yet another advantage is that the underwater communication system of the present invention provides an underwater communications system with minimal additional equipment to a scuba diver.

Still another advantage is that the underwater communication system of the present invention provides a mouthpiece which may be optimized in construction to allow the user to speak as intelligibly as possible while wearing the mouthpiece.

A further advantage is that the underwater communication system of the present invention provides an underwater communications system using bone conducted sound through a mouthpiece which can be customized to the individual user for improved sound quality transmission by enhanced tooth to mouthpiece contact.

A still further advantage is that the underwater communication system of the present invention uses bone conducted sound through a mouthpiece which can utilize different user selectable channels so that more than one system can be used in the same area without imposing sound transmissions on those not intended to receive the transmission.

An additional advantage is that the sound transducers can be constructed to be inserted into a currently commercially available mouthpiece to transmit sound through the mouthpiece into the cochlea.

Another advantage is that the underwater communication system of the present invention may provide stereophonic output through independent transducers on each side of the mouth for directional location of underwater objects.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a top view illustrating one embodiment of the scuba diving mouthpiece of the present invention;

FIG. 3 is a fragmentary, sectional view taken along line 3—3 in FIG. 2;

FIG. 4 is an enlarged, plan view of an embodiment of the sound transducer and sound conductor of the present invention;

FIG. 5 is a sectional view taken along line 5—5 in FIG. 4;

FIG. 9 illustrates a top view of another embodiment of the present invention, having one sound transducer and one microphone;

FIG. 10 is a front view of the embodiment shown in FIG. 9;

FIG. 11 illustrates a top view of another embodiment of the present invention, having a single sound transducer to receive and transmit sound;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
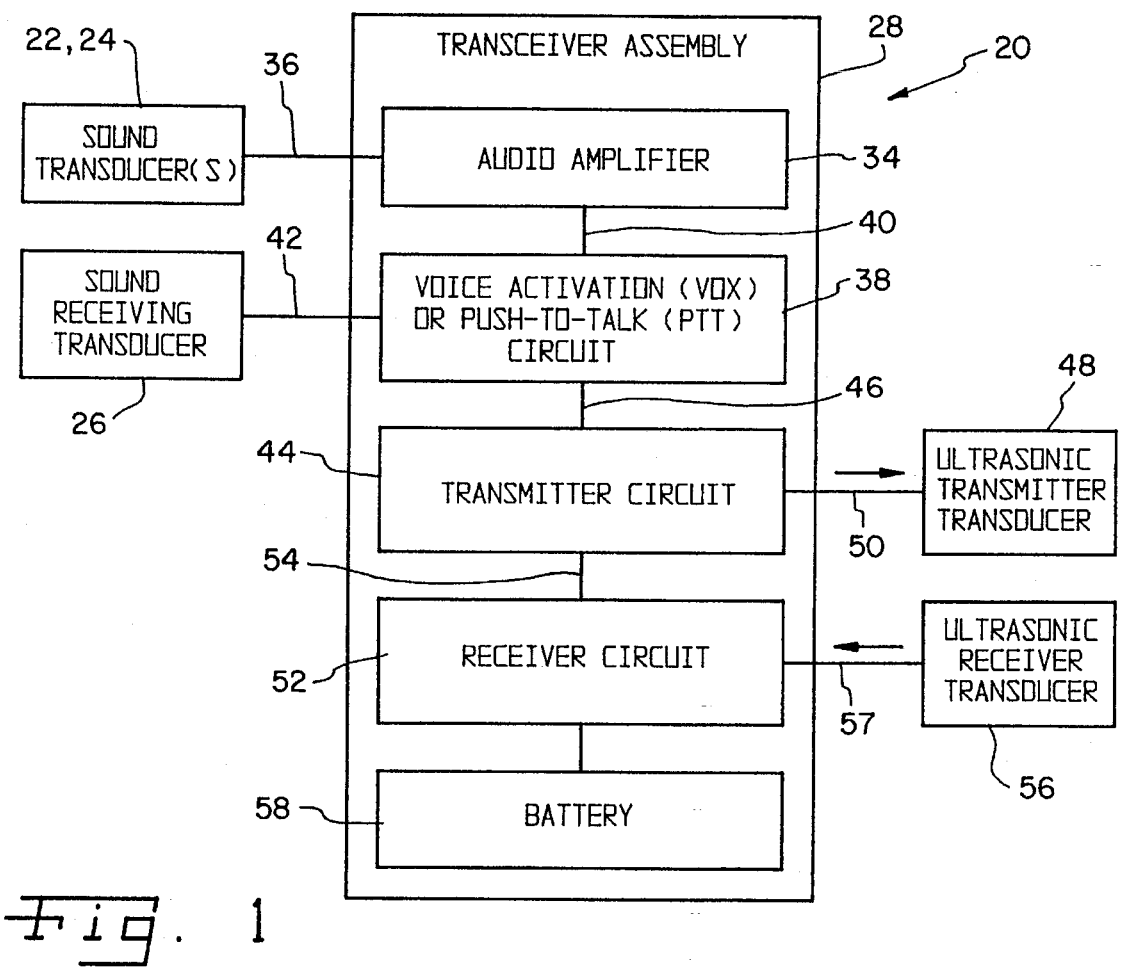
FIG. 1 is a schematic illustration of one embodiment of an underwater sound communication system of the present invention.

Referring now to the drawings, and more particularly to FIG. 1, there is shown a schematic illustration of an embodiment of an underwater sound communication system 20 of the present invention. Communication system 20 generally includes sound transducers 22, 24, sound receiving transducer 26, transceiver assembly 28, ultrasonic transmitter transducer 48, and ultrasonic receiver transducer 56.

Sound transducers 22, 24 are sound production devices of one or more types, but generally that of voice coil design, magnetostrictive transducer, piezoelectric transducer, or electrostatic transducer design. Sound transducers 22, 24 are capable of receiving and/or transmitting audio sound, and are capable of effecting vibrations in the approximate frequency range of 100 to 10,000 Hz. Sound transducers 22, 24 which have been found to operate satisfactory with the present invention are a model No. DMT-11RP-A transducer manufactured by RDI Electronics. Generally, sound transducers 22, 24 are capable of operating with a peak power of less than 2 watts but nominally at less than 1 watt.

Sound receiving transducer 26 may include one or more transducers of various types, but preferably is that of a waterproof, sealed cartridge microphone. An example of a microphone 26 which has been found to operate satisfactorily with the present invention is model No. EM 6BN, manufactured by RDI Electronics.

Transceiver assembly 28 houses the electronic circuitry necessary for the transmission, reception, amplification, modulation of transmitted information, demodulation of received information, and including a power supply, channel switch, power switch, audio volume and voice actuated transmission switch. Transceiver assembly 28 may be in the form of a printed circuit board, application specific integrated circuit (ASIC), programmable chip, or other electronic processing unit.

More particularly, and with reference to the embodiment shown in FIG. 1, transceiver assembly 28 includes an audio amplifier 34 which is connected to sound transducers 22, 24 via line 36. In the event that sound transducers 22, 24 are used to receive sound (rather than transmit sound), an amplifier 34 amplifies the signals received from sound transducers 22, 24 prior to transmitting the same to voice activation (VOX) or push-to-talk (PTT) circuit 38 via line 40. VOX or PTT circuit 38 is also connected to sound receiving transducer 26 via line 42. As would be obvious to one skilled in the art, VOX circuit 38 as it is connected to the input from sound transducers 22, 24 and/or sound receiving transducer 26 is actuated by the human voice (VOX).

A transmitter circuit 44 (to be described in more detail hereinafter) is connected to VOX of PTT circuit 38 via line 46. Transmitter circuit 44 is tuned for modulation at a desired ultrasonic frequency and is user selectable using a channel selector (not shown). Transmitter circuit 44 provides an output signal to ultrasonic transmitter transducer 48 via line 50.

A receiver circuit 52 is connected to sound transducers 22, 24 through audio amplifier 34 and via lines 54, 46 and 40. That is, signals which are output from receiver circuit 52 may simply bypass transmitter circuit 44 and VOX or PTT circuit 38. Receiver circuit 52 receives signals from an ultrasonic receiver transducer 56 via line 57.

Ultrasonic transmitter transducer 48 and ultrasonic receiver transducer 56 are respectively capable of transmitting and receiving ultrasonic sound through the water medium. Ultrasonic transmitter transducer 48 and ultrasonic receiver transducer 56 are each sealed, waterproof, and mounted in such a way to facilitate effective and substantially unimpaired transmission and reception of ultrasonic communications through the water medium. Ultrasonic transmitter transducer 48 and ultrasonic receiver transducer 56 are shown in the embodiment of FIG. 1 as being separate from transceiver assembly 28. However, it will be appreciated by those skilled in the art that ultrasonic transmitter transducer 48 and ultrasonic receiver transducer 56 may be easily incorporated into transceiver 28. Transceiver assembly 28 is therefore defined as optionally including ultrasonic transmitter transducer 48 and ultrasonic receiver transducer 56 as a part thereof. In the event that ultrasonic transducers 48, 56 are disposed away from transceiver assembly 28, wires 50, 57 are routed to the back of the scuba vest or to another location where ultrasonic transducers 48, 56 are located. The location of ultrasonic transducers 48, 56 are user selectable depending on preference, provided that there is a substantially unobstructed path for transmission and reception.

Transceiver assembly 28 also includes a power supply which may be in the form of a battery 56. Battery 56 supplies power to each of the electronic components housed within or connected to transceiver assembly 28.

Transceiver assembly 28, including ultrasonic transmitter transducer 48 and ultrasonic receiver transducer 56, is configured to send and receive audio signals to sound transducers 22, 24 and sound receiving transducer 26, as well as send and receive ultrasonic sounds through ultrasonic transmitter transducer 48 and ultrasonic receiver transducer 56, as will be described in more detail hereinafter. In addition to processing audio and ultrasonic signals in a particular fashion to be described, transceiver assembly 28 can also be configured to send and/or receive ultrasonic signals to and from commercially available underwater communication systems. For example, transceiver assembly 28 can be configured to send and/or receive single, side band frequency ultrasonic signals (with or without a carrier) which are compatible with commercially available underwater communication systems.

Referring now to FIGS. 2 and 3, an embodiment of a scuba diving mouthpiece 60 of the present invention is shown. Mouthpiece 60 has an exterior shape which is similar to that of a conventional scuba diving mouthpiece. Molded of polysilicone, silicone rubber, natural rubber, polyvinylacetate-copolymer polyethylene, or any other compliable plastic or rubber or any combination thereof, mouthpiece 60 is designed to fit most if not all conventional scuba second stage regulators. The shape of mouthpiece 60 is similar to conventional mouthpieces and provides identical performance as conventional mouthpieces with respect to those criteria associated with normal underwater breathing and securing of the second stage regulator to the user.

Mouthpiece 60 provides the diver with a mouthpiece which looks and feels very similar to a conventional mouthpiece, thus eliminating the need for special training or skills for the use thereof. Therefore, the molding of the mouthpiece is carried out in such a fashion to render a finished product which looks and feels similar to a conventional mouthpiece. The only visible difference is a slightly differently shaped biteplate and a wiring bundle 64 which emerges from the bottom right hand side (relative to the user, but could be located at any desirable location) near the connection to the second stage regulator, and rod shaped protrusions from the front of the mouthpiece near the regulator. Wire bundle 64 is maintained in tight contact with the second stage pressurized air conduit tube using one or more types of wound material either adhesively or mechanically bound. The result of this is a second stage regulator which looks, feels and operates like a conventional system. While similar in appearance, feel and breathing operation to a conventional mouthpiece, the present invention provides sound with sufficient amplitude and clarity for the diver to hear sound with the same clarity that the diver would in air.

Molded into body 61 of mouthpiece 60, near biteplate 62, are sound transducers 22, 24, one in each side. Generally, transducers 22, 24 are capable of operating with a peak power of less than 2 watts but nominally at less than 1 watt. Sound transducers 22, 24 are configured and tuned to provide optimum effectiveness at the desired frequency bandwidth. Sound transducers 22, 24 are each connected to a wire bundle 64 (illustrated schematically as line 36 in FIG. 1). Sound transducers 22, 24 are also connected to respective sound conducting members 66 which are preferably in the form of metal, sound conducting strips of material 66. However, sound conducting members 66 can also be made from plastic, ceramic, or other suitable material. Sound conducting members 66 are disposed within biteplate 62. Acceptable sound levels have been obtained using sound transducers 22, 24 which are connected to sound conducting members 66, as shown in FIG. 2. Sound conducting members 66 function to transmit sound generated by sound transducers 22, 24 through the mouthpiece and into biteplates 62 which are close to the maxillary and mandibular teeth of the diver.

Referring now to FIGS. 4 and 5, details of sound transducer 22 connected to sound conducting member 66 are shown. It is to be understood that sound transducer 24 is similar in construction to sound transducer 22. Sound transducer 22 may be molded into mouthpiece 60, or may be configured to be inserted into a commercially available scuba mouthpiece. Sound transducer 22 includes a wire 36 forming a wire bundle 64 (FIG. 2) which is in communication with transceiver assembly 28. Sound transducer 22 has a diaphragm 68 (FIG. 5) therein. In the embodiment shown, diaphragm 68 is a thin, metallic diaphragm, to which sound conducting member 66 is directly attached. For example, sound conducting member 66 may be attached to diaphragm 68 via an adhesive, weld or other suitable attachment device. Sound vibrations in diaphragm 68 in turn cause sound vibrations in sound conducting member 66.

U-shaped mouthpiece 60 is molded or otherwise configured such that transducers 22, 24 are sealed and waterproof. The biteplate 62 may or may not be constructed with a differing material from the remainder of mouthpiece 60. In one embodiment of the invention, biteplate 62 is constructed from a material having a higher modulus of elasticity thereby providing optimum sound conduction from sound transducers 22, 24 to the teeth. The selection of this material is made to provide an optimization of sound fidelity while providing maximum comfort to the diver.

Mouthpiece 60 can be constructed having a monolithic or laminated construction. For example, mouthpiece 60 can include laminated layers of hard and soft rubber, plastic, or silicone materials forming the biteplate. Moreover, mouthpiece 60 can be constructed from a material that is customizable for one person's mouth. A customizable mouthpiece acts to transfer sound with increased fidelity because of the increased surface contact between the teeth and biteplate 28. Mouthpiece 60 can also be constructed such that it is not user customized. A non-customizable mouthpiece could be purchased by a scuba diving instructor for use in a teaching situation or other multi-user intended applications.

Figure 6:
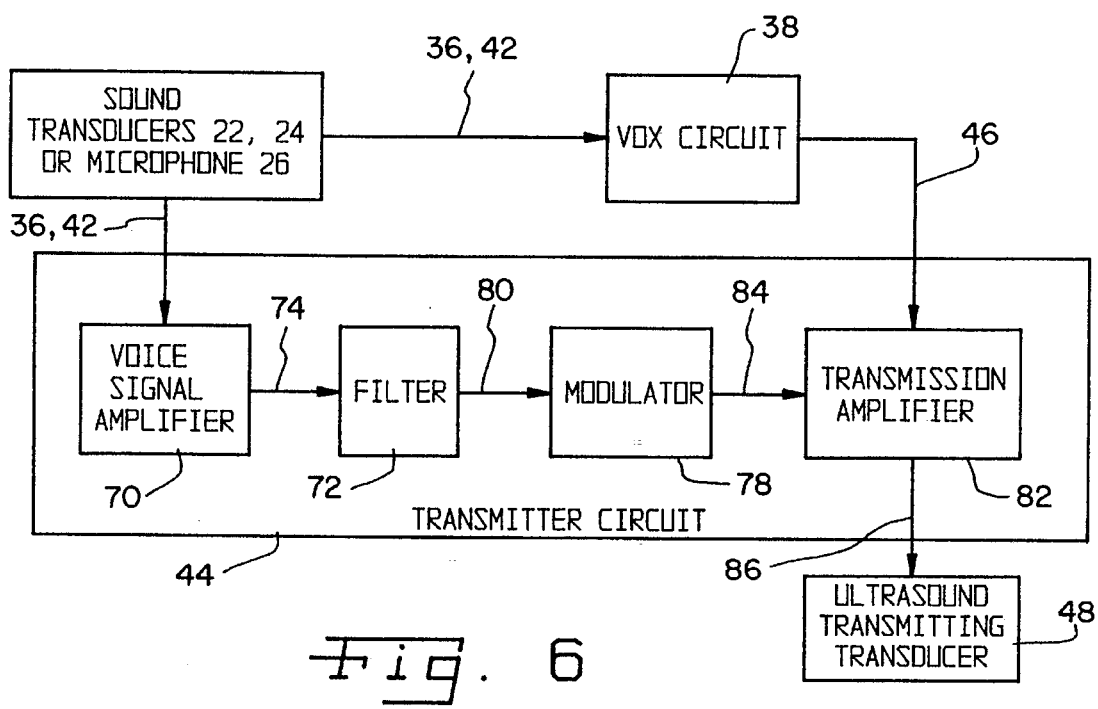
FIG. 6 is a schematic illustration detailing the transmitter circuit shown in FIG. 1.

Referring now to FIG. 6, details of transmitter circuit 44 (FIG. 1) are shown. A voice signal originating from a sound transducer 22, 24, a microphone 26 or other sound source is simultaneously transmitted to a voice signal amplifier 70 and VOX circuit 38 via lines 36, 42. A filter 72 receives the amplified signals from voice signal amplifier 70 via line 74 and may include, e.g., band pass filters which provide discrimination against inherent noise associated with scuba diving. Filter 72 includes components normally used in audio crossover circuits, and is generally in the form of a low pass filter with an approximate 3,000 Hz cutoff. Noises from breathing, bubbles, movement and ancillary noises can thus be canceled using filter 72. A modulator 78 is connected to filter 72 via line 80 and receives signals therefrom. Modulator 78 functions to superimpose the voice signal on a higher frequency carrier. Based upon an amplitude modulated signal around the principal frequency, modulator 78 outputs signals via line 84 to transmission amplifier 82. Transmission amplifier 82 functions to increase the signal power to a level necessary for transmission. Transmission amplifier 82 also receives signals from VOX circuit 38 via line 46, such that transmission amplifier 82 is switched to an ON state during a time that a diver speaks, and to an OFF state when the diver is not speaking. Transmission amplifier 82 then outputs signals via line 86 to ultrasonic transmitting transducer 48 for transmission of ultrasonic sound through the water medium.

VOX circuit 38 (FIG. 6) may incorporate a memory buffering system (not shown) which stores spoken sounds for approximately 200 milliseconds and subsequently reproduces those sounds to transmitter circuit 44. Such a buffering system operates on a first in, first out format, thus acting as a sound delay. The buffered output is transmitted to amplifier 70 (FIG. 6) such that delays normally witnessed with the use of VOX transmitters will not be noticed. Thus, signals with truncated front ends will be avoided thereby adding to the clarity and quality of the transmitted sounds.

Figure 7:
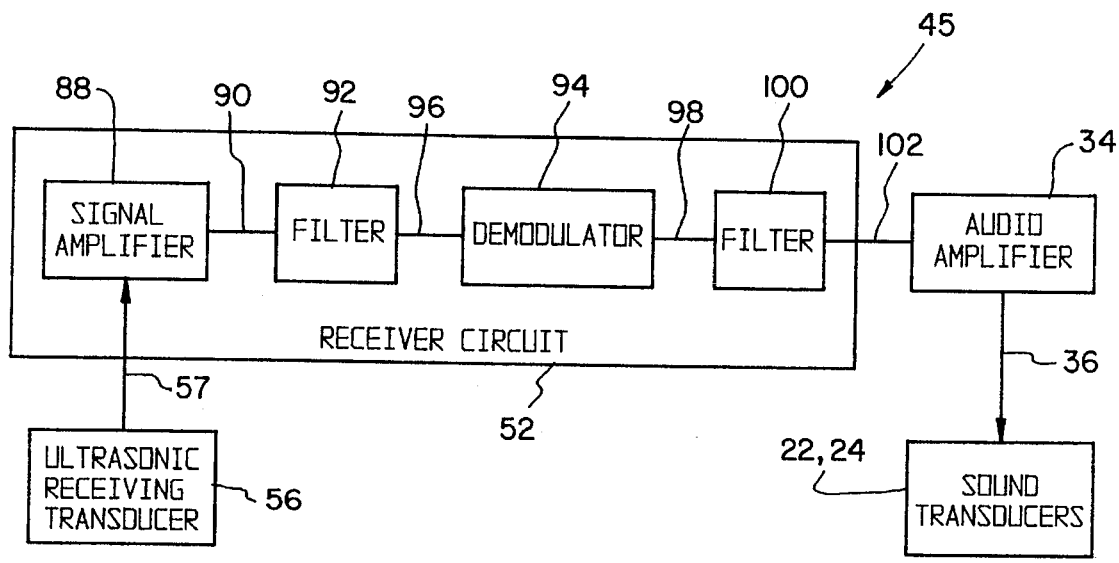
FIG. 7 is a schematic illustration detailing the receiver circuit shown in FIG. 1.

Referring now to FIG. 7, receiver circuit 52 (FIG. 1) is shown in greater detail. Receiver circuit 52 receives signals from ultrasonic receiving transducer 56 representing ultrasonic sound via line 57. Signals received via line 57 are passed to a signal amplifier 88 where the signal undergoes a gain in power necessary for a satisfactory signal to noise ratio. Signal amplifier 88 outputs the amplified signals via line 90 to a filter 92. Filter 92 is preferably in the form of a narrow, band pass filter which rejects particular channels, radio frequencies and/or ultrasonic sounds. A demodulator 94 receives the filtered signals via line 96 and demodulates the ultrasonic signals to audio signals. The resultant signals are then outputted via line 98 to a low pass filter 100 having an approximate cutoff frequency of 3,000 to 5,000 Hz. Low pass filter 100 includes components and a construction similar to audio crossover circuits. Audio amplifier 34 (FIGS. 1 and 7) receives the filtered signals via line 102 and transmits the amplified signals to sound transducers 22, 24 via line 36.

Figure 8:
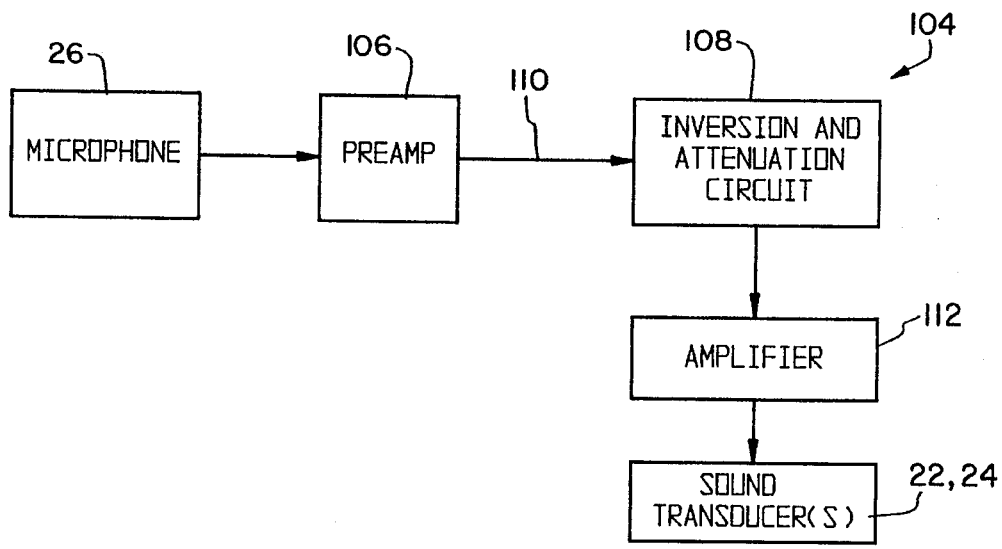
FIG. 8 is a schematic illustration detailing an embodiment of a noise cancellation circuit of the present invention.

Referring to FIG. 8, a noise cancellation circuit 104 is shown. Noise cancellation circuit 104 may optionally be disposed within and form a part of transceiver assembly 28. Sound which is considered noise emanated from the air regulator or other equipment reaches microphone 26 in scuba mouthpiece 60. Output from microphone 26 is carried to transceiver assembly 28 where it is split to transmitter circuit 44 (FIG. 3) and noise cancellation circuit 104. The signal received from microphone 26 is amplified in a preamplifier 106 to a signal having an intensity sufficient for inversion and attenuation circuit 108. Inversion and attenuation circuit 108 receives the amplified signals via line 110. Inversion and attenuation circuit 108 utilizes comparator and inversion amplifiers, and then subsequently attenuates the resultant signal such that when it reaches sound transducers 22, 24 or another separate sound transducer or speaker, after being amplified by an amplifier 112, the signal is 180 degrees out of phase and of similar amplitude to that of the initial noise sound. The resulting attenuation of the noise provides the scuba diver with a quieter diving environment and improves the communication sound fidelity and clarity. Noise cancellation circuit 104 is switched OFF during a transmission in order to avoid attenuating the sender's voice sound.

FIGS. 9 and 10 illustrate top and front views, respectively, of an alternative embodiment of a mouthpiece 120 which has a single sound transducer 22 that transmits sound through conducting strips of material 66 to both sides of the mouth. A separate microphone 26 is embedded within mouthpiece 120 and receives sound when the user speaks.

FIG. 11 shows an alternative embodiment of a mouthpiece 130 which has a single sound transducer 22 which transmits sound to both sides of the mouth through sound conducting strips of material 66, and also acts to receive sound, i.e., acts as a microphone.

Figure 12:
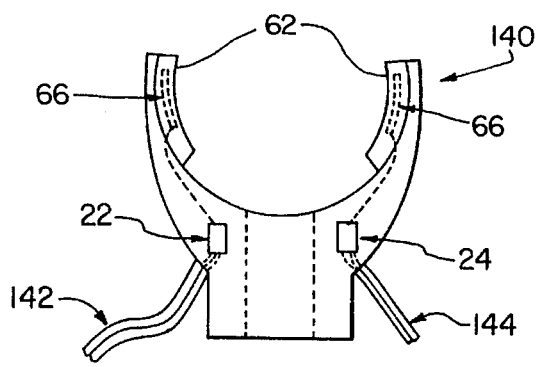
FIG. 12 illustrates a top view of another embodiment of the present invention, having two sound transducers which independently receive and transmit sound for stereophonic communication.

FIG. 12 shows an alternative embodiment of a mouthpiece 140 having independent sound transducers 22, 24 on each side of the mouth. Sound transducers 22, 24 are connected to sound conducting members 66. Sound transducers 22, 24 are wired independently via wire bundles 142, 144 to transceiver assembly 28, and may be independently excited from two different ultrasonic receiver transducers 56 placed on the right and left side of the scuba diver with associated independent signal processing circuitry. Independent excitation of transducers 22, 24 provides binaural (i.e., stereophonic) sound for directional sensing ability underwater. This is useful when searching for underwater objects that are setup to emit ultrasonic waves, such as in an echo-search-ranging system.

Figure 13:
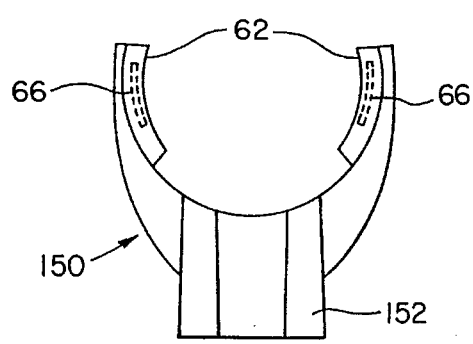
FIG. 13 illustrates a top view of another embodiment of the present invention, which allows for partial closure of the front air passage in order to enunciate certain consonants.
Figure 14:
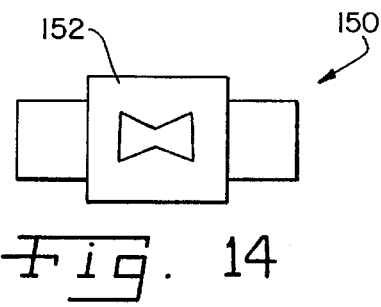
FIG. 14 is a front view of the embodiment shown in FIG. 13.

FIGS. 13 and 14 illustrate another embodiment of a mouthpiece 150 which allows for partial closure of the front part of the mouthpiece, in order to permit the enunciation of consonants which require lip closure. That is, certain consonants cannot be pronounced without closing the lips and therefore are not pronounced with the presence of an oral mouthpiece which protrudes from the mouth. This however is not a large problem as the diver will quickly adapt their speech to be intelligible to the receiving party. Additionally, the receiving swimmer can generally comprehend the voice sounds without the articulation of the aforementioned consonants. Alternatively, with the embodiment shown in FIGS. 13 and 14, an area 152 is formed from a different material than the remainder of mouthpiece 150. Similarly, mouthpiece 150 can be formed with a particular construction allowing at least partial closure of the front part thereof (not shown).

Figure 15:
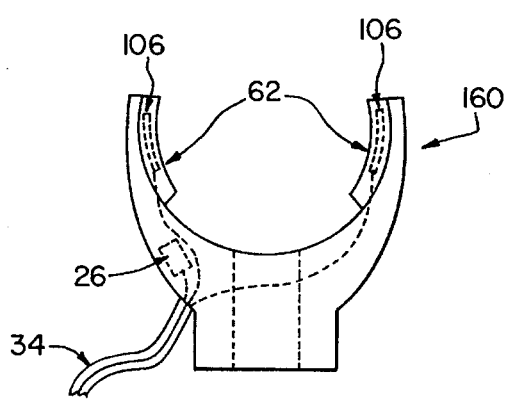
FIG. 15 illustrates a top view of another embodiment of the present invention.

FIG. 15 shows another embodiment of a mouthpiece 160 having sound transducers 106 cast into biteplate 62, rather than sound conducting strips 66 (FIGS. 2 and 3) in biteplate 62 connected to the previously mentioned sound transducers 22, 24. A microphone 26 is also embedded within mouthpiece 160.

Figure 16:
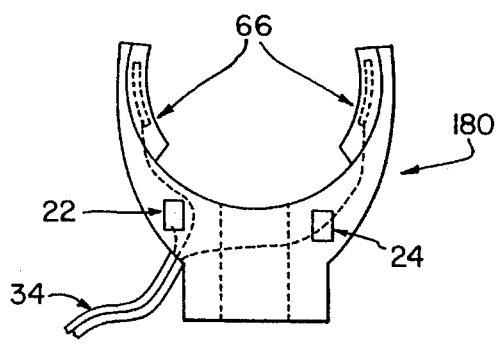
FIG. 16 illustrates a top view of another embodiment of the present invention, having two sound transducers which each receive and transmit sound.

FIG. 16 shows an alternative embodiment of a mouthpiece 180 similar to FIGS. 2 and 3, but additionally utilizing one or both sound transducers 22, 24 as a microphone. The embodiment shown in FIG. 16 therefore does not include a microphone 26.

Figure 17:
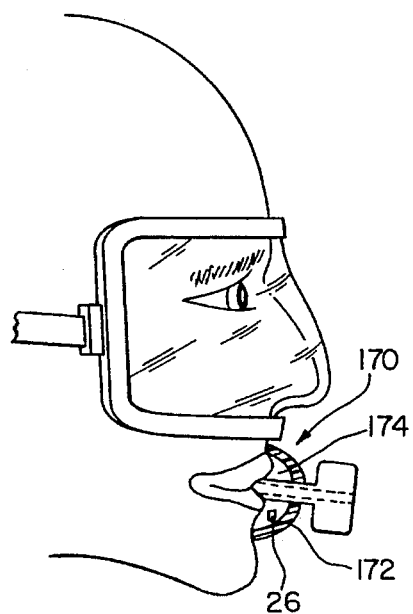
FIG. 17 is a side view of another embodiment of the present invention.

FIG. 17 shows another embodiment of a mouthpiece 170 which provides further speech enhancements, if desired. An enlarged piece 172 is fashioned to cover the lips and provide an air space 174. A microphone 26 is located in air space 174 between the diver's mouth and the second stage regulator (not shown).

The operation of the invention will now be discussed briefly with particular reference to the embodiment of communication system 20 and mouthpiece 60 shown in FIGS. 1–3. A free swimmer suits up with the scuba diving gear as usual. Before entering the water, a power switch (not shown) is turned ON which activates communication system 20 and powers receiver circuit 52 and VOX switch 38 to the ON state. Alternatively, a water sensor activation switch may be utilized which provides automatic power ON and OFF of communication system 20. The channel selector switch (not shown) is configured to a desired channel such that the swimmer is in communication with all other divers on that channel who are in the immediate vicinity. Once this procedure is completed, the diver enters the water as normal. At this time, the diver is able to hear through tooth and bone conduction all ultrasonic signals which are received by communication system 20. Under normal usage, divers who wish to communicate with one another select a common channel over which to communicate, and dive normally. When a diver speaks, VOX circuit 38 switches transmitter circuit 44 to the ON state. Sound transducers 22, 24 and/or microphone 26 transmit signals to transceiver assembly 28, wherein the signals are modulated electronically, amplified and transmitted to ultrasonic transmitter transducer 48, as described in detail above. Ultrasonic transmitter transducer 48 transmits ultrasonic signals omnidirectionally in the water medium, whereby the signals are received by other divers. The transmitted signals are received by all divers in range who are tuned to the same frequency, whereby the signals are received by their communication systems 20 by the antenna or receiving ultrasonic transducer, amplified, demodulated to audible frequencies, amplified and reproduced by sound transducers 22, 24 in mouthpiece 60. The resultant sound is thereby heard by the receiving divers. This process can be carried out without the need for divers pressing buttons or making adjustments during diving. Therefore, the communication system 20 does not contribute encumbrances to the diving experience. This is especially useful for those engaging in commercial or military usage where the hands are kept available for other uses. Because the unit is self contained and does not require the use of hands for operation, the diver is free to do that which he or she would do without the system. The difference is that the diver is in voice communication with a diving partner or partners or with a receiving/transmitting unit.

Another application for the underwater communication device of the present invention is one-way communication. A diver can transmit voice signals to a receiving unit attached to a boat or other surface, land, or underwater unit. It is also possible for a transmitter unit to send communication signals to a diver.

The present invention has application to all sectors of underwater swimming, such as commercial, military and recreational applications. Communication system 20 is intended to be connected to an existing diving apparatus, can be fitted to any type or brand of modern diving equipment. It provides clear and easily understood voice communication between 2 or more divers, while having an effective range of approximately 500 meters, and aside from providing sound communication is basically transparent and unobtrusive to the diver. Communication system 20 of the present invention does not require the use of a hood or any other non-standard recreational scuba diving apparatus or device.

In the embodiment shown in the drawings, communication system 20 of the present invention is shown for use as an underwater communication system. However, it is also to be understood that the mouthpiece of the present invention including sound transducers and/or microphones therein may be used for land-based applications. For example, certain sporting activities such as football, boxing, soccer, basketball, wrestling and the like may require the use of a mouthpiece. Using the sound transducers and mouthpiece of the present invention, it is likewise possible to transmit audio sound via bone conduction to a user of a mouthpiece. If the mouthpiece of the present invention is used for land-based applications, it will be appreciated that it may be desirable to make certain modifications to the circuitry used to carry out the present invention. For example, the ultrasonic frequency which is used to communicate between two or more individuals under water may be replaced with an RF or other frequency for land-based applications. Of course, the present invention may also be used for other applications apparent to those skilled in the art.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A scuba diving mouthpiece for supplying air to a diver, said mouthpiece attachable to a source of air, said mouthpiece comprising:
   a mouth engageable body including at least one biteplate, each said biteplate adapted for being disposed between and engageable by the teeth of the driver;
   at least one sound transducer associated with said body; and
   at least one sound conducting member, each said sound conducting member being operatively connected to one of said sound transducers, each said sound conducting member being embedded within said body and configured to receive audio sounds from said connected sound transducer, each said sound conducting member also being configured to transmit audio sounds through at least one said biteplate, whereby said audio sounds may be conducted to the teeth of the diver.

2. The scuba diving mouthpiece of claim 1, wherein said at least one biteplate comprises two biteplates, each said biteplate adapted for being disposed between and engageable by the teeth of the diver.

3. The scuba diving mouthpiece of claim 1, wherein each said sound transducer comprises a vibratable membrane, each said sound conducting member attached to a respective said membrane.

4. The scuba diving mouthpiece of claim 1, wherein each said sound conducting member comprises a sound conducting strip.

5. The scuba diving mouthpiece of claim 1, wherein each said sound conducting member is comprised of a metallic material.

6. The scuba diving mouthpiece of claim 1, wherein said at least one biteplate comprises two biteplates, and wherein said at least one sound transducer comprises one sound transducer.

7. The scuba diving mouthpiece of claim 1, wherein said at least one biteplate comprises two biteplates, and wherein said at least one sound transducer comprises two sound transducers respectively associated with said two biteplates.

8. The scuba diving mouthpiece of claim 1, wherein said at least one biteplate comprises two biteplates, and wherein said at least one sound transducer comprises three sound transducers, two of said three sound transducers being respectively disposed within said two biteplates.

9. The scuba diving mouthpiece of claim 1, wherein said sound transducer is capable of receiving sounds through said biteplate.

10. The scuba diving mouthpiece of claim 1, wherein said sound transducer is disposed within said body.

11. The scuba diving mouthpiece of claim 1, wherein said body is comprised of a material consisting essentially of polyvinylacetate-copolymer polyethylene.

12. The scuba diving mouthpiece of claim 1, further comprising a transceiver connected to each said sound transducer, said transceiver adapted for receiving and transmitting ultrasonic signals.

13. The scuba diving mouthpiece of claim 1, wherein said body is connectable to a second stage regulator.

14. The scuba diving mouthpiece of claim 1, wherein said sound transducer is operable between a frequency range of approximately 100 to 10,000 hertz, said sound transducer being selected from the group consisting of a voice coil type transducer, piezoelectric transducer, and magnetostrictive transducer.

15. The scuba diving mouthpiece of claim 1, wherein said body is moldable for enhanced engagement with the teeth of the diver.

16. The scuba diving mouthpiece of claim 1, further comprising an actuating device for actuating said at least one sound transducer, said actuating device comprising one of a push-to-talk actuator and voice actuator.

17. The scuba diving mouthpiece of claim 1, further comprising an enlarged piece connected to the body which is sized and configured to cover the lips of the diver, said enlarged piece defining an air chamber, said at least one sound transducer comprising a plurality of sound transducers, one of said sound transducers disposed in said air chamber.

18. A communication system, comprising:
   a transceiver adapted for receiving and transmitting signals corresponding to sounds; and
   a mouthpiece including at least one sound transducer disposed therein, each said sound transducer connected to said transceiver, said mouthpiece further including at least one sound conducting member embedded therein, each said sound conducting member being operatively connected to one of said sound transducers and being configured to transmit audio sounds through said mouthpiece.

19. The communication system of claim 18, wherein each said sound transducer comprises a membrane, each said sound conducting member being attached to a respective said membrane.

20. The communication system of claim 18, wherein said at least one sound transducer comprises at least two sound transducers, each said sound transducer being independently operable to provide stereophonic sound output.

21. The communication system of claim 18, wherein said transceiver sends audio signals to and receives signals from each said transducer, and further comprising means for processing said signals.

22. The communication system of claim 21, further comprising means for reducing and canceling portions of said signals representing audio noise.

23. The communication system of claim 18, wherein said transceiver includes user selectable channels for transmitting and receiving.

24. The scuba diving mouthpiece of claim 18, wherein each said sound conducting member comprises a sound conducting strip.

25. The scuba diving mouthpiece of claim 18, wherein each said sound conducting member is comprised of a metallic material.

26. A mouthpiece which may be positioned within the mouth of a user, said mouthpiece comprising:
   a U-shaped portion including at least one biteplate, said biteplate adapted for being disposed between and engageable by the teeth of the user;
   at least one sound transducer associated with said U-shaped portion; and at least one sound conducting member, each said sound conducting member being operatively connected to one of said sound transducer, each said sound conducting member being embedded within said body and configured to receive audio sounds from said connected sound transducer, each said sound conducting member also being configured to transmit audio sounds through at least one said biteplate, whereby said audio sounds may be conducted to the teeth of the user.

27. The scuba diving mouthpiece of claim 26, wherein each said sound conducting member comprises a sound conducting strip.

28. The scuba diving mouthpiece of claim 26, wherein each said sound conducting member is comprised of a metallic material.

* * * * *

UNITED STATES PATENT AND TRADEMARK OFFICE
CERTIFICATE OF CORRECTION

PATENT NO.   : 5,579,284
DATED        : November 26, 1996
INVENTOR(S)  : David F. May It is certified that error appears in the above-indentified patent and that said Letters Patent is hereby corrected as shown below:

<u>COLUMN 6</u>

Line 2, delete "56", both occurrences, and substitute --58-- therefor.

Signed and Sealed this

Twenty-fifth Day of March, 1997

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,579,284
DATED : November 26, 1996
INVENTOR(S) : David F. May

It is certified that error appears in the above-indentified patent and that said Letters Patent is hereby corrected as shown below:

Title page, item [63]

Insert

--Related U.S. Application Data:

Non-Provisional based on Provisional Application Ser. No. 60/011,345, July 21, 1995.--

Signed and Sealed this

Sixth Day of May, 1997

Attest:

BRUCE LEHMAN

Attesting Officer

Commissioner of Patents and Trademarks